(12) United States Patent
Park et al.

(10) Patent No.: US 9,005,790 B2
(45) Date of Patent: Apr. 14, 2015

(54) BATTERY MODULE

(75) Inventors: Shi-Dong Park, Yongin-si (KR);
Tae-Yong Kim, Yongin-si (KR)

(73) Assignees: Samsung SDI Co., Ltd., Yongin-si (KR); Robert Bosch GmbH, Stuttgart (DE)

( * ) Notice: Subject to any disclaimer, the term of this patent is extended or adjusted under 35 U.S.C. 154(b) by 107 days.

(21) Appl. No.: 13/078,788

(22) Filed: Apr. 1, 2011

(65) Prior Publication Data

US 2012/0121956 A1    May 17, 2012

(30) Foreign Application Priority Data

Nov. 12, 2010  (KR) .................. 10-2010-0112922

(51) Int. Cl.
*H01M 2/02* (2006.01)
*H01M 2/10* (2006.01)

(52) U.S. Cl.
CPC .......... *H01M 2/1061* (2013.01); *H01M 2/0245* (2013.01); *H01M 2/0257* (2013.01); *H01M 2/02* (2013.01); *H01M 2/0287* (2013.01); *H01M 2/0295* (2013.01); *H01M 2/1094* (2013.01); *H01M 2/026* (2013.01)

(58) Field of Classification Search
USPC ......................................... 429/148, 163, 176
See application file for complete search history.

(56) References Cited

U.S. PATENT DOCUMENTS

| 1,497,531 | A |   | 6/1924  | Ahlgren |                |
|-----------|---|---|---------|---------|----------------|
| 1,560,172 | A |   | 11/1925 | Chamberlain |            |
| 3,988,170 | A | * | 10/1976 | Koch et al. | ............. 429/163 |
| 4,100,333 | A | * | 7/1978  | Haas et al. | ................ 429/156 |
| 4,981,004 | A | * | 1/1991  | Weber | ..................... 52/223.9 |
| 5,298,681 | A | * | 3/1994  | Swift et al. | ...................... 174/97 |
| 5,800,942 | A | * | 9/1998  | Hamada et al. | ............... 429/148 |
| 6,040,080 | A |   | 3/2000  | Minami et al. |              |
| 6,805,253 | B1 | * | 10/2004 | Nicholson et al. | ........... 220/4.05 |
| 7,294,431 | B2 |   | 11/2007 | Puttaiah et al. |            |
| 7,926,602 | B2 |   | 4/2011  | Takasaki |                |
| 2005/0233206 | A1 | * | 10/2005 | Puttaiah et al. | ............... 429/120 |
| 2012/0040229 | A1 |   | 2/2012  | Zhu et al. |              |

FOREIGN PATENT DOCUMENTS

| CN | 1960920 A    | 5/2007  |
|----|--------------|---------|
| CN | 201408805 Y  | 2/2010  |
| DE | 1 771 093    | 5/1971  |
| GB | 601506       | 5/1948  |
| JP | 8-264169     | 10/1996 |
| JP | 10-162797    | 6/1998  |

(Continued)

OTHER PUBLICATIONS

Basic Plastics Education, Module 4, slides 4, 13, & 22, available at http://www.modernplastics.com/basic_plastics_education.htm.*

(Continued)

*Primary Examiner* — Ula C. Ruddock
*Assistant Examiner* — Scott J Chmielecki
(74) *Attorney, Agent, or Firm* — Christie, Parker & Hale, LLP

(57) ABSTRACT

A battery module includes a plurality of rechargeable batteries, and a module case housing the plurality of rechargeable batteries, wherein at least one part of one side of the module case includes reinforcing fiber. Accordingly, the strength of the module case is improved.

17 Claims, 7 Drawing Sheets

(56) References Cited

FOREIGN PATENT DOCUMENTS

| JP | 2001-009860 | A | 1/2001 |
| JP | 2001-291494 | A | 10/2001 |
| JP | 2002-245994 | | 8/2002 |
| JP | 2002-304974 | | 10/2002 |
| JP | 2006-140025 | | 6/2006 |
| JP | 2008-162499 | | 7/2008 |
| JP | 2012-018797 | | 1/2012 |
| KR | 10-0876277 | B1 | 12/2008 |
| KR | 10-2009-0024410 | | 3/2009 |
| KR | 10-2009-0027067 | | 3/2009 |
| KR | 10-2010-0041442 | A | 4/2010 |

OTHER PUBLICATIONS

Machine English Translation of JP 2001-291494 A.
Machine English Translation of JP 2001-009860 A.
European Search Report dated Mar. 14, 2012, for corresponding European Patent application 11173257.4, 5 pages.
Espacenet English machine translation of German Patent 1 771 093, listed above, 3 pages.
Patent Abstracts of Japan, and English machine translation of Japanese Publication 08-264169, listed above (4 pages).
Patent Abstracts of Japan, and English machine translation of Japanese Publication 2012-018797, dated Jan. 26, 2012, listed above, (11 pages).
English translation of JPO Office action, dated Mar. 26, 2013, previously cited in the IDS submitted on Apr. 16, 2013, 2 pages.
Machine English Translation of JP 2002-0245994, 25 pages.
Machine English Translation of JP 2002-304974, 10 pages.
Machine English Translation of JP 2006-140025, 14 pages.
SIPO Office action dated Dec. 9, 2013, with English translation, for corresponding Chinese Patent application 201110186376.2, (13 pages).
SIPO Office action dated Jul. 25, 2014, with English translation for corresponding Chinese Patent application 201110186376.2, (12 pages).

\* cited by examiner

BATTERY MODULE

CROSS-REFERENCE TO RELATED APPLICATION

This application claims priority to and the benefit of Korean Patent Application No. 10-2010-0112922, filed in the Korean Intellectual Property Office on Nov. 12, 2010, the entire content of which is incorporated herein by reference.

BACKGROUND

1. Field

The described technology relates to a battery module. More particularly, the described technology relates generally to a battery module including a module case having an improved structure.

2. Description of Related Art

Unlike a primary battery not capable of being charged, a rechargeable battery is capable of being charged and discharged. A small capacity rechargeable battery may be used for a small electronic device such as a mobile phone, a laptop computer, and a camcorder. A large capacity rechargeable battery may be used as a power source for driving a motor of a hybrid vehicle.

Lately, a high power rechargeable battery using high energy density non-aqueous electrolyte has been developed. The high power rechargeable battery may be used for a device requiring high power, for example, a driving motor of an electric vehicle.

For example, the large capacity battery module is generally configured of a plurality of rechargeable batteries coupled in series. Such rechargeable batteries may be formed to have a cylindrical shape or a rectangular prismatic shape.

While repeatedly being charged or discharged, the volume of the rechargeable battery is expanded. That is, a swelling phenomenon is generated. Such a swelling phenomenon pressurizes a module case that establishes an outward appearance of the battery module of the rechargeable batteries. Such pressurizing may destroy the module case.

If the thickness of the module case is increased in order to enhance the strength of the module case, the weight of the battery module is excessively increased. Such excessive weight deteriorates the performance of a device having the battery module.

The above information disclosed in this Background section is only for enhancement of understanding of the background of the described technology and therefore it may contain information that does not form the prior art that is already known in this country to a person of ordinary skill in the art.

SUMMARY

Aspects of embodiments of the present invention are directed toward a battery module having an enhanced strength.

An embodiment of the present invention provides a battery module including a plurality of rechargeable batteries, and a module case housing the plurality of rechargeable batteries, wherein at least one part of one side of the module case includes reinforcing fiber.

The module case may include a housing unit for housing the plurality of rechargeable batteries and a cover connected to the housing unit. The housing unit may include the reinforcing fiber.

The housing unit may include a floor, a first side wall protruded from the floor and arranged in an alignment direction of the plurality of rechargeable batteries, and a second side wall protruded from the floor and connected to one end of the first side wall. The second side wall may extend in a width direction of the module case.

A floor reinforcing rib may extend on the floor and a first reinforcing rib may extend on the first side wall, wherein each of the floor reinforcing rib and the first reinforcing rib extend in an alignment direction of the plurality of rechargeable batteries. The floor reinforcing rib and/or the first reinforcing rib may include reinforcing fiber extending in an alignment direction of the plurality of rechargeable batteries.

The second side wall may include at least a first portion of the reinforcing fiber extending in a width direction of the module case. The second side wall may include a second reinforcing rib extending in a width direction of the module case.

The cover may include at least a portion of the reinforcing fiber extending in an alignment direction of the plurality of rechargeable batteries. The module case may be made of engineering plastic, and the reinforcing fiber may be disposed within the engineering plastic.

The engineering plastic may include at least one material selected from the group consisting of poly amide (PA), poly acetal, and poly carbonate (PC). The module case may include a reinforcing fiber layer and the reinforcing fiber may be disposed within the reinforcing fiber layer.

The reinforcing fiber layer may be formed on an outer surface of the module case. The reinforcing fiber layer may be formed on an inner surface of the module case.

The reinforcing fiber may be formed of glass fiber. The reinforcing fiber may be made of carbon fiber. The reinforcing fiber may be arranged along an alignment direction of the plurality of rechargeable batteries.

The reinforcing fiber may include a plurality of reinforcing fibers.

The reinforcing fiber may be configured to support a pressure when the plurality of rechargeable batteries are expanded while being charged and/or discharged.

According to an exemplary embodiment of the present invention, the module case includes reinforcing fiber formed in the alignment of the rechargeable batteries. Accordingly, the strength of the module case is improved.

DETAILED DESCRIPTION

Figure 1:
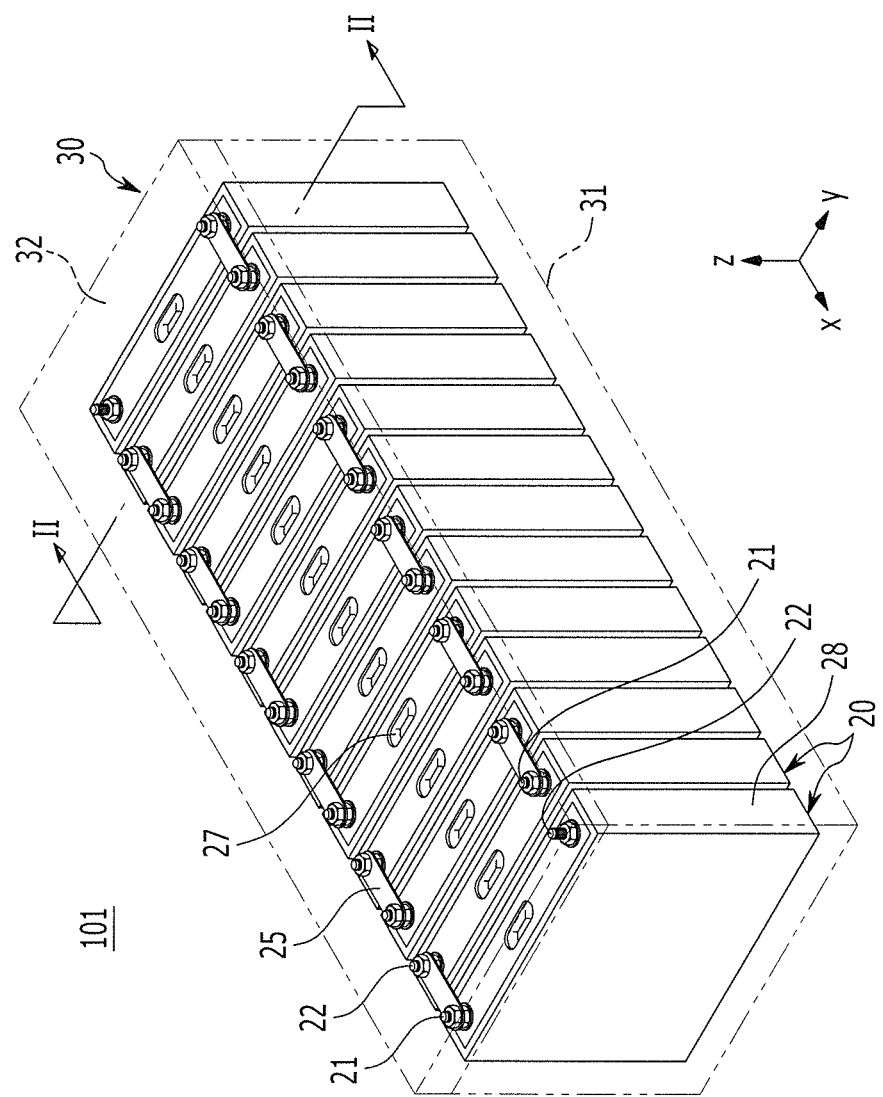
FIG. 1 is a perspective view illustrating a battery module according to a first embodiment of the present invention.

The present invention will be described more fully hereinafter with reference to the accompanying drawings, in which embodiments of the invention are shown. As those skilled in the art would realize, the described embodiments may be modified in various different ways, all without departing from the spirit or scope of the present invention.

The drawings and description are to be regarded as illustrative in nature and not restrictive. Further, like reference numerals designate like elements throughout the specification.

Throughout this specification and the claims that follow, when it is described that an element is "coupled" to another element, the element may be "directly coupled" to the other element or "electrically coupled" to the other element through one or more third elements. In addition, unless explicitly described to the contrary, the word "comprise" and variations such as "comprises" or "comprising" will be understood to imply the inclusion of stated elements but not the exclusion of any other elements.

Figure 2:
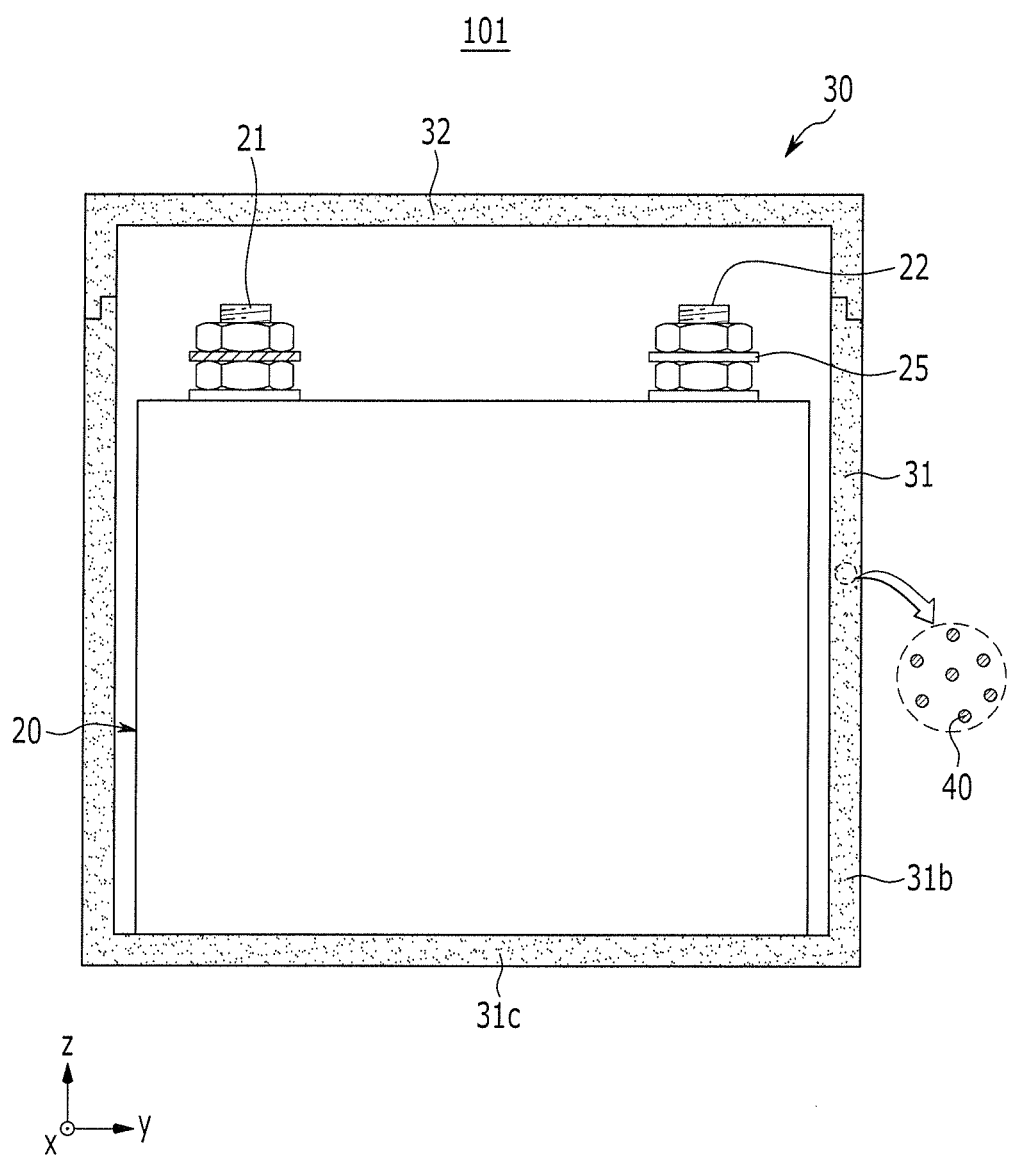
FIG. 2 is a cross-sectional view of the embodiment of FIG. 1 taken along the line II-II.

FIG. 1 is a perspective view illustrating a battery module according to a first embodiment of the present invention. FIG. 2 is a cross-sectional view of the embodiment of FIG. 1 taken along the line II-II.

Referring to FIGS. 1 and 2, the battery module 101 according to the first exemplary embodiment includes a plurality of rechargeable batteries 20 and a module case 30 housing the plurality of rechargeable batteries 20.

The plurality of rechargeable batteries 20 are installed in the module case 30. For example, each rechargeable battery 20 of the plurality of rechargeable batteries 20 is a lithium ion rechargeable battery and formed in a rectangular prismatic shape. However, the present invention is not limited thereto. The present invention may be applied to various types of batteries such as a lithium polymer battery or a cylindrical battery.

The rechargeable battery 20 includes a positive electrode terminal 21, a negative electrode terminal 22, and a discharge member 27. The discharge member 27 is configured to open at a set or predetermined pressure and discharge a gas. The discharge member 27 provides a path that is configured to open at a set or predetermined pressure and discharge a gas inside the rechargeable battery 20 when the internal pressure of the rechargeable battery is increased to or above the set or predetermined pressure.

Each adjacent pair of the plurality of rechargeable batteries 20 are coupled in series by a bus bar 25 and installed inside the module case 30.

Figure 3:
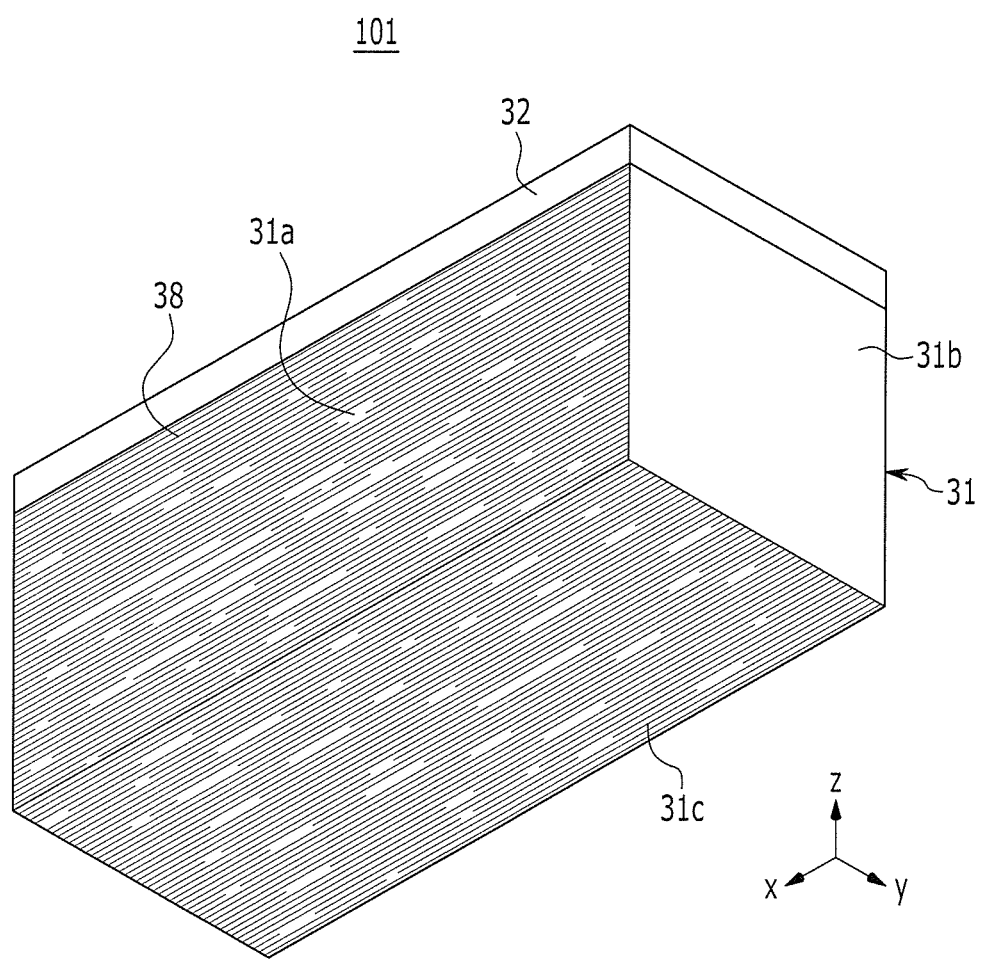
FIG. 3 is a perspective view of a battery module according to the embodiment of FIG. 1.

As shown in FIGS. 2 and 3, the module case 30 is formed in about a rectangular prismatic shape and includes a housing unit 31 defining an internal space and a cover 32 configured to connect to an opening of the housing unit 31. The housing unit 31 includes a floor 31c, two first side walls 31a and two second side walls 31b protruded from the floor 31c. The floor 31c is formed as a rectangular plate. The side walls 31a and 31b are upwardly protruded from the floor 31c.

The first side walls 31a extend in an alignment direction of the rechargeable batteries 20 (an x-axis direction in FIG. 3), and ends of first side walls 31a are connected to ends of the second side walls 31b.

A housing unit 31 is formed of a reinforcing fiber 38 inserted inside engineering plastic.

The first side walls 31a have the reinforcing fiber 38. The reinforcing fiber 38 is formed in a shape of a line and disposed inside the first side walls 31a. The reinforcing fiber 38 may be distributed entirely on or in the first side walls 21a like the present embodiment, or may be distributed partially on predetermined parts of the first side walls 31a.

The reinforcing fiber 38 extends in an alignment direction (x-axis direction in FIG. 3) at the first side walls 31a, and a plurality of reinforcing fibers 38 are disposed at a set or predetermined gap.

In one embodiment, the reinforcing fiber 38 is disposed in the floor 31c and extends in the alignment direction of the rechargeable batteries 20.

In one embodiment, the engineering plastic is made of poly amide (PA), poly acetal, and/or poly carbonate (PC). In one embodiment, the reinforcing fiber 38 is made of material having strength greater than engineering plastic.

For example, the reinforcing fiber 38 may be made of glass fiber or carbon fiber. In particular, and in one embodiment, the carbon fiber has superior thermal conductivity and can quickly distribute heat generated at a set or predetermined part of the module case 30 to uniformly cool the rechargeable batteries 20. Further, the generated heat can be easily discharged to the outside of the module case 30.

The reinforcing fiber 38 is formed in a shaped of a line. The reinforcing fiber 38 extends from one end to the other end of the first side walls 31a and the floor 31c. The filament shaped reinforcing fiber 38 made of a plurality of pieces may be divided and arranged. Such arrangement of reinforcing fiber 38 may be formed by improving a method of supplying reinforcing fiber during the forming process of the housing unit 31.

Since the reinforcing fibers 38 according to the first embodiment of the present invention are connected to and extend in the alignment direction of the rechargeable batteries 20, the module case 30 can be stably supported against a pressure when the rechargeable batteries 20 are expanded while being charged and discharged. When the rechargeable batteries 20 are expanded, the displacement is accumulated in the alignment direction of the rechargeable batteries 20. Accordingly, such a large stress may destroy the module case 30. However, the reinforcing fiber 38 according to the present exemplary embodiment can stably support the structure of the rechargeable batteries 20.

Also, durability for impact from the outside can be improved according to the first embodiment. Particularly, when the battery module 101 is adapted to an electric vehicle or an electric scooter, the module case 30 may be destroyed by external impact generated in traffic accident. When the module case 30 is destroyed, fire or electric shock may be generated due to short-circuit. However, the reinforcing fiber 38 according to the present exemplary embodiment absorbs the impact, thereby improving the strength of the module case 30. Accordingly, the safety of the battery module 101 is improved.

Since the strength of the module case 30 is improved for a given thickness, the appropriate strength can be sustained while reducing the thickness of the module case 30. Accordingly, the overall weight of the battery module 101 can be reduced.

Figure 4:
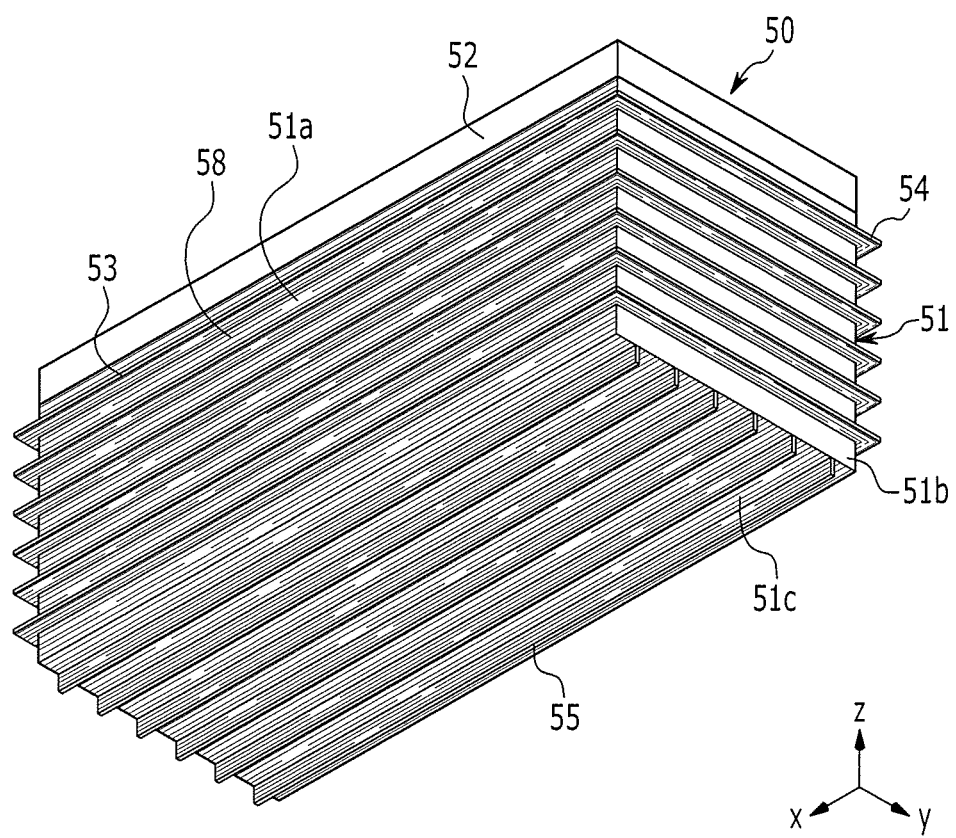
FIG. 4 is a perspective view of a battery module according to a second embodiment of the present invention.

FIG. 4 is a perspective view of a battery module according to a second embodiment of the present invention.

Referring to FIG. 4, a battery module 102 according to the second embodiment includes a plurality of rechargeable batteries and a module case 50 internally housing the plurality of rechargeable batteries.

The battery module 102 according to the second embodiment includes the same structure except a structure of the module case 50 in comparison with the first embodiment. Accordingly, the detailed description of the same structures is not provided.

The module case 50 is formed in about a rectangular prismatic shape and includes a housing unit 51 and a cover 52 configured to connect to an opening of the housing unit 51. The module case 50 has a closed and sealed structure. The plurality of rechargeable batteries are cooled by cooling the module case 50.

The housing unit 51 includes a floor 51c and side walls 51a and 51b protruded from the floor 51c. The floor 51c is formed as a rectangular plate, and the side walls 51a and 51b are protruded upwardly from side ends of the floor 51c. The first side wall 51a extends in an alignment direction of the rechargeable batteries, and two second side walls 51b are connected to two ends of the first side wall 51a.

The housing unit 51 includes reinforcing ribs 53, 54, and 55 for improving strength thereof. The reinforcing ribs 53, 54, and 55 are protruded from the first side wall 51a, the second side wall 51b, and the floor 51c, respectively. The reinforcing rib 53 formed on the first side wall 51a is protruded from an outer surface of the first side wall 51a in a vertical direction (y-axis direction) and extends in an alignment direction of the rechargeable batteries (x-axis direction). The reinforcing rib 54 formed on the second side wall 51b is protruded from an outer surface of the second side wall 51b of the module case 50 in a vertical direction (x-axis direction), and extends in a width direction (y-axis direction) of the module case 50. The reinforcing ribs 53 and 54 are formed in a shaped of a line, and the reinforcing rib 53 of the first side wall 51a is connected to the reinforcing rib 54 of the second side wall 51b. Meanwhile, the reinforcing rib 55 formed on the floor 51c is protruded downward from the floor 51c in a z-axis direction, and extends in the alignment direction of the rechargeable batteries.

Further, the housing unit 51 is formed of engineering plastic with reinforcing fibers 58 inserted therein. The reinforcing fiber is formed in the line shape, and is disposed in the first side wall 51a, the floor 51c, and the reinforcing ribs 53, 54, and 55.

The reinforcing fiber 58 in the first side wall 51a extends in the alignment direction of the rechargeable batteries, and a plurality of reinforcing fibers 58 are disposed at a set or predetermined gap. The reinforcing fiber 58 is also disposed in the floor 51c, and extends in the alignment direction of the rechargeable batteries. Further, the reinforcing ribs 53 and 55 have the reinforcing fiber 58, which extends in the alignment direction of the rechargeable batteries. Meanwhile, the reinforcing rib 54 formed on the second side wall 51b has the reinforcing fiber 58, which extends in a width direction of the module case 50.

In one embodiment, the engineering plastic is made of poly amide (PA), poly acetal, and/or poly carbonate (PC; Poly carbonate). Furthermore, in one embodiment, the reinforcing fiber 58 is made of material having strength greater than that of the engineering plastic.

For example, the reinforcing fiber 58 may be made of glass fiber or carbon fiber. Particularly, and in one embodiment, the carbon fiber has superior thermal conductivity. Accordingly, heat generated at a set or predetermined part of the module case 50 is rapidly distributed, and the rechargeable batteries are uniformed cooled. Further, the heat generated from within the module case 50 is easily discharged to the outside thereof.

The reinforcing fiber 58 is formed in a shaped of a line and continuously formed from one end to the other end of the first side wall 51a and the floor 51c. Further, a filament shaped reinforcing fiber 58 formed of (or comprising) a plurality of pieces (fibers) that may be divided into a plurality of portions and disposed at different regions. Such alignment of the reinforcing fiber 58 may be formed by improving a method of supplying reinforcing fiber during a forming process of the housing unit.

As described above, the reinforcing ribs 53 and 55 extend on the housing unit 51 along the alignment direction of the rechargeable batteries, and the reinforcing rib 54 extends in a width direction. The reinforcing fiber 58 is continuously disposed along the alignment direction of the rechargeable batteries. Accordingly, the reinforcing ribs 53, 54, and 55 and the reinforcing fiber 58 stably support the module case 50 against pressure applied to the module case 50 when the rechargeable batteries expand while repeatedly being charged and discharged. When the rechargeable batteries expand, the displacement is accumulated in the alignment direction of the rechargeable batteries and very large force acts on the module case 50. Accordingly, the module case 50 may be destroyed. However, the reinforcing fiber 58 according to the present exemplary embodiment can stably support the module case 50 against such a force. Further, the reinforcing ribs 53, 54, and 55 are formed and the reinforcing fiber 58 is disposed in the module case according to the present exemplary embodiment. Accordingly, the durability is improved against impact transferred from the outside, and the heat transferred to the module case 50 through the reinforcing ribs 53, 54, and 55 can be rapidly discharged.

Figure 5:
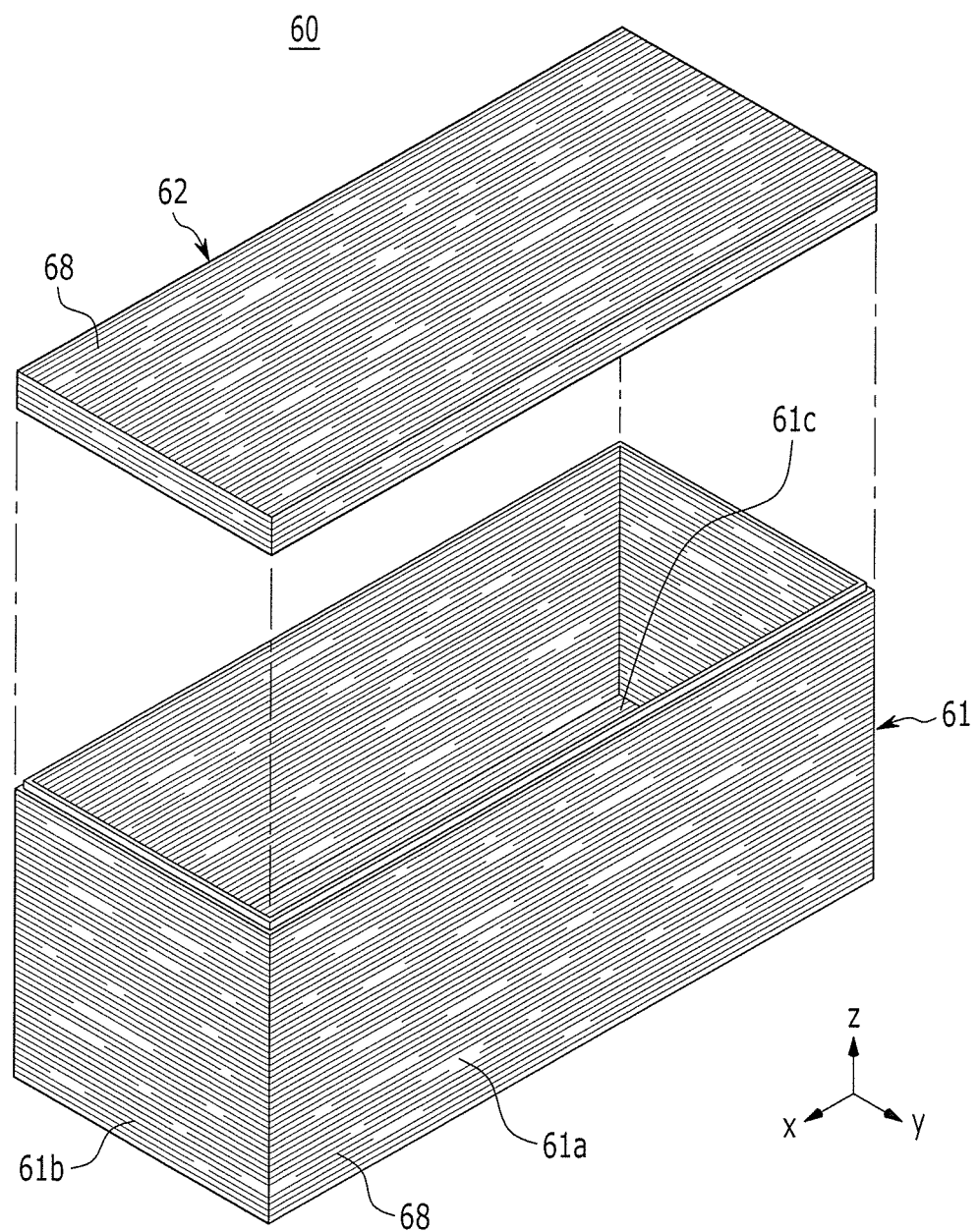
FIG. 5 is an exploded perspective view illustrating a module case of a battery module according to a third embodiment of the present invention.

FIG. 5 is an exploded perspective view illustrating a module case of a battery module according to a third embodiment of the present invention.

Referring to FIG. 5, a battery module according to the third embodiment includes a plurality of rechargeable batteries and a module case 60 for housing rechargeable batteries.

The battery module according to the present embodiment has the same structure in comparison to the first embodiment except for the structure of the module case 60. Accordingly, the detailed description of the same structures is not provided.

The module case 60 is formed in about a rectangular prismatic shape. The module case 60 includes a housing unit 61 defining an internal space and a cover 62 connected to an opening of the housing unit 61.

The housing unit 61 includes a floor 61c and side walls 61a and 61b protruded from the floor 61c. The floor 61c is formed in a shape of a rectangular plate. The side walls 61a and 61b are protruded upwardly from side ends of the floor 61. The first side wall 61a extends in an alignment direction of the rechargeable batteries. Two ends of the first side wall 61a are connected to two second side walls 61b.

The housing unit 61 is formed of engineering plastic with reinforcing fiber 68 inserted therein. The reinforcing fiber 68 is formed in a shape of a line. Accordingly, the first side wall 61a, the second side wall 61b, and the floor 61c have the reinforcing fiber 68.

The reinforcing fiber 68 extends in an alignment direction (x-axis direction) of the rechargeable batteries at the first side wall 61a and the floor 61c, and a plurality of reinforcing fibers 68 are disposed at a set or predetermined gap. Meanwhile, the reinforcing fiber 68 extends in the second side wall 61b in a width direction (y-axis direction) of the module case 60. Accordingly, the second side walls 61b support the first side wall 61a.

The cover 62 also includes the reinforcing fiber 68. The cover 62 is formed of engineering plastic with the reinforcing fiber 68 inserted therein. The reinforcing fiber 68 extends in the cover 62 in an alignment direction of the rechargeable batteries.

The engineering plastic may be formed of ply amide (PA), poly acetal, and/or poly carbonate (PC). Further, the reinforcing fiber 68 may be made of material having strength greater than that of the engineering plastic, such as glass fiber and carbon fiber. The reinforcing fiber 68 is formed in a shape of a line and continuously formed from one end to the other end in the first side wall 61*a* and the floor 61*c*. Further, the reinforcing fiber 68 made of a plurality of pieces may be disposed. Such an alignment of the reinforcing fiber 68 may be formed by improving a method of supplying reinforcing fiber 68 during a forming process of the housing unit 61.

As described above, the housing unit 61 and the cover 62 according to the present embodiment include the reinforcing fiber 68 formed along the alignment direction of the rechargeable batteries. Accordingly, the module case 60 is stably supported against pressure applied to the module case 60 when the rechargeable batteries expand while repeatedly being charged and discharged.

Figure 6:
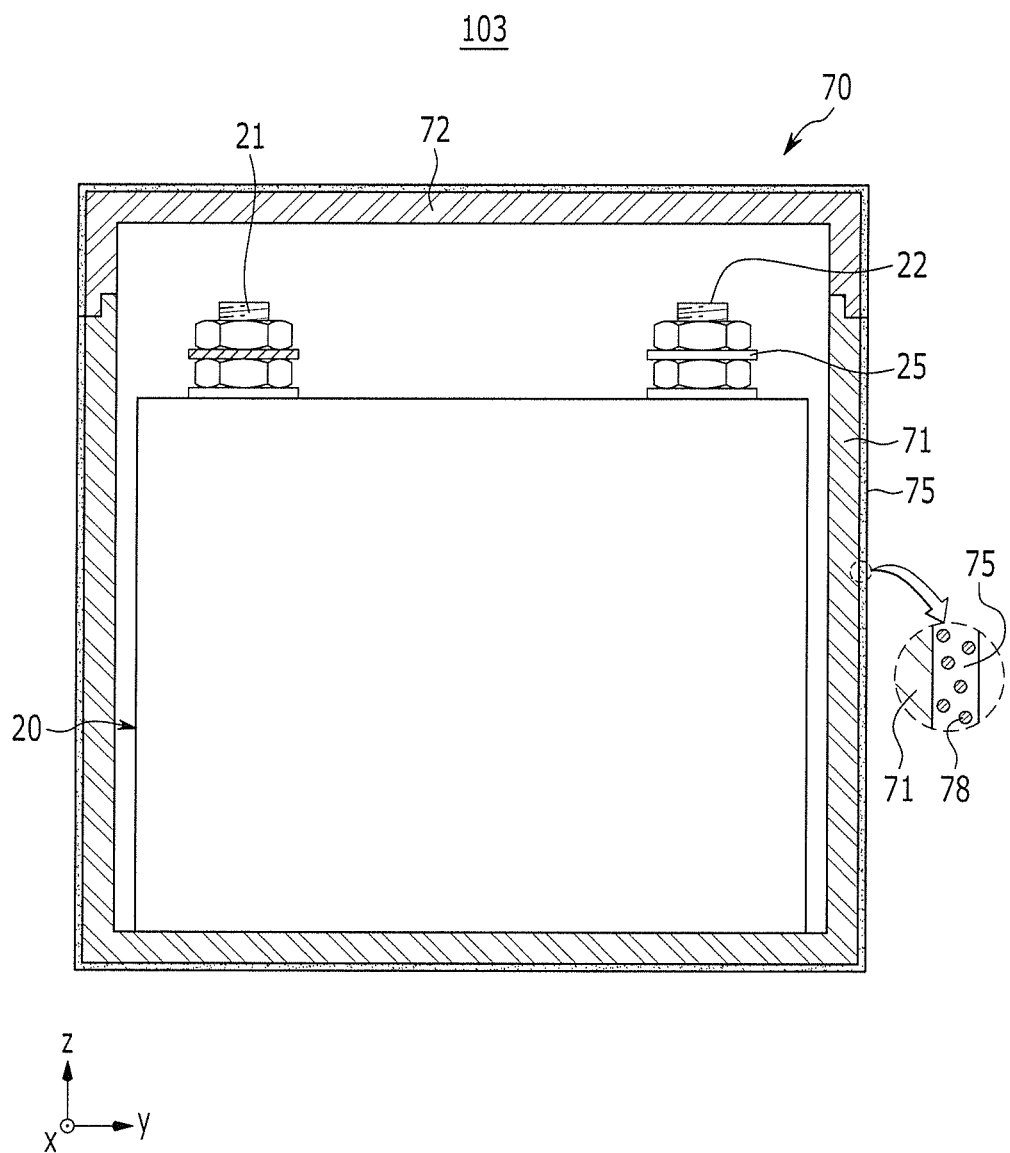
FIG. 6 is a cross-sectional view of a battery module according to a fourth embodiment of the present invention.

FIG. 6 is a cross-sectional view of a battery module according to a fourth embodiment of the present invention.

Referring to FIG. 6, the battery module 103 according to the fourth embodiment includes a plurality of rechargeable batteries 20 and a module case 70 housing the plurality of rechargeable batteries 20.

The battery module according to the present embodiment has the same structure in comparison with the first embodiment except for the structure of the module case 70. Accordingly, the detailed description of the same structures is not provided.

The module case 70 is formed in about a rectangular prismatic shape and includes a housing unit 71 defining an internal space, a cover 72 connected to an opening of the housing unit 71, and a reinforcing fiber layer 75 formed at an outer side of the module case 70.

The housing unit 71 and the cover 72 are formed of engineering plastic. The reinforcing fiber layer 75 is formed on and fixed at the housing unit 71 and the cover 72. The reinforcing fiber layer 75 is made of densely aligned reinforcing fibers 78 and synthetic resin for fixing the reinforcing fibers 78. The reinforcing fibers 78 are formed in an alignment direction of the rechargeable batteries 20.

The synthetic resin may be formed various types of synthetic resins as well as engineering plastic. The reinforcing fiber layer 75 may be melted and adhered to or coated on the housing unit 71 and the cover 72.

As described, the reinforcing fiber layer 75 according to the present exemplary embodiment is formed on the outer surface of the module case 70. Accordingly, the strength of the module case 70 is improved and the module case having the reinforcing fiber 78 can be conveniently manufactured.

Figure 7:
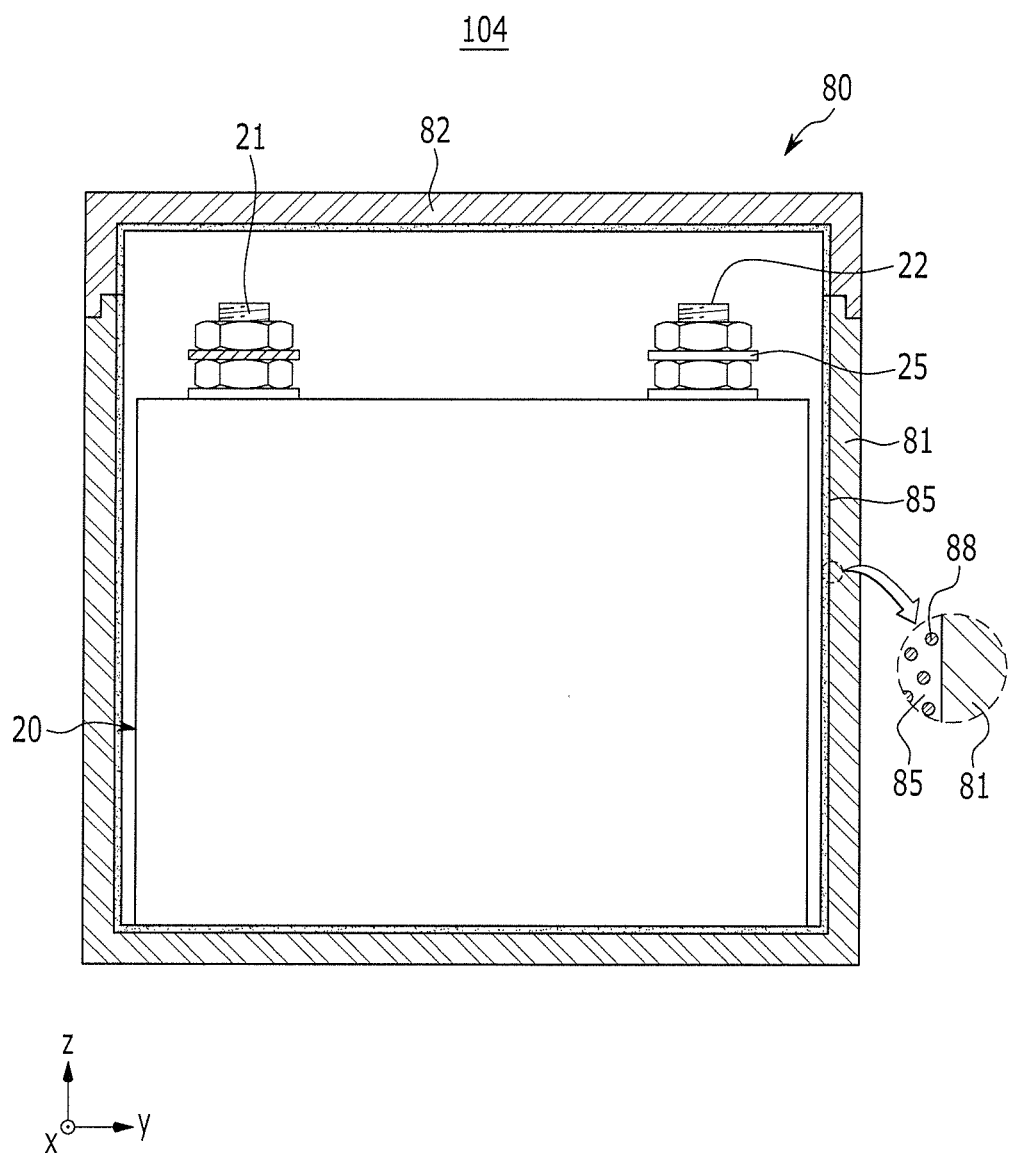
FIG. 7 is a cross-sectional view of a batter module according to a fifth embodiment of the present invention.

FIG. 7 is a cross-sectional view of a battery module according to a fifth embodiment of the present invention.

Referring to FIG. 7, the battery module 104 according to the fifth embodiment includes a plurality of rechargeable batteries 20 and a module case 80 housing the plurality of rechargeable batteries 20.

The battery module 104 according to the present embodiment has the same structure in comparison with the first embodiment except for the structure of the module case 80. Accordingly, the detailed description of the same structures is not provided.

The module case 80 is formed in about a rectangular prismatic shape. The module case 80 includes a housing unit 81 defining an internal space, a cover 82 connected to an opening of the housing unit 81, and a reinforcing fiber layer 88 formed on an inner surface of the housing unit 81 and the cover 82.

The housing unit 81 and the cover 82 are made of engineering plastic. The reinforcing fiber layer 85 is formed on and fixed at the inner side of the housing unit 81 and the cover 82. The reinforcing fiber layer 85 is formed of densely formed reinforcing fibers 88 and synthetic resin for fixing the reinforcing fibers 88. The reinforcing fibers 88 are formed in the alignment direction of the rechargeable batteries 20.

The synthetic resin may be made not only of engineering plastic but also of various types of synthetic resins. The reinforcing fiber layer 85 may be melted and adhered to the housing unit 81 and the cover 82, and coated on the housing unit 81 and the cover 82.

As described above, the reinforcing fiber layer 85 according to the present exemplary embodiment is formed on the inner side of the module case 80. Accordingly, the strength of the module case 80 is improved. Further, the module case 80 having the reinforcing fiber 88 can be conveniently manufactured.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS

101, 102, 103: battery module
21: positive electrode terminal
27: discharge member
31, 51, 61, 71, 81: housing unit
31*a*, 51*a*, 61*a*: first side wall
31*c*, 51*c*, 61*c*: floor
53, 54 55: reinforcing rib
20: rechargeable battery
22: negative electrode terminal
30, 50, 60, 70, 80: module case
32, 52, 62, 72, 82: cover
31*b*, 51*b*, 61*b*: second side wall
38, 58, 68, 78, 88: reinforcing fiber
75, 85: reinforcing fiber layer

What is claimed is:

1. A battery module comprising:
   a plurality of rechargeable batteries; and
   a module case housing the plurality of rechargeable batteries, and comprising a housing unit for housing the plurality of rechargeable batteries and a cover connected to the housing unit;
   wherein the plurality of rechargeable batteries comprises a plurality of lithium ion rechargeable batteries each comprising its own rectangular prismatic case;
   wherein the module case comprises
      a first side wall comprising a first portion of reinforcing fibers, and
      a first reinforcing rib on the first side wall, the first reinforcing rib extending in an alignment direction of the plurality of rechargeable batteries and comprising a second portion of reinforcing fibers; and
      wherein substantially all of the first portion of reinforcing fibers and substantially all of the second portion of reinforcing fibers extend along the alignment direction of the rechargeable batteries to provide support to the battery module against pressure on the module case caused by expansion of the rechargeable batteries.

2. The battery module of claim 1, wherein the housing unit comprises the first and second portions of reinforcing fibers.

3. The battery module of claim 1, wherein the housing unit comprises a floor, the first side wall protruded from the floor and arranged in the alignment direction of the plurality of rechargeable batteries, and a second side wall protruded from the floor and connected to one end of the first side wall; and wherein the second side wall extends in a width direction of the module case.

4. The battery module of claim 3, wherein the floor and the first side wall comprise at least the first portion of the reinforcing fibers.

5. The battery module of claim 4, wherein a floor reinforcing rib extends on the floor, and
wherein each of the floor reinforcing rib and the first reinforcing rib extend in the alignment direction of the plurality of rechargeable batteries.

6. The battery module of claim 5, wherein the floor reinforcing rib and/or the first reinforcing rib comprises at least the second portion of the reinforcing fibers extending in the alignment direction of the plurality of rechargeable batteries.

7. The battery module of claim 5, wherein the second side wall comprises a second reinforcing rib extending in the width direction of the module case.

8. The battery module of claim 3, wherein the second side wall comprises at least a first portion of the reinforcing fibers extending in the width direction of the module case.

9. The battery module of claim 1, wherein the cover comprises at least a portion of the reinforcing fibers extending in the alignment direction of the plurality of rechargeable batteries.

10. The battery module of claim 1, wherein the module case is made of engineering plastic, and the reinforcing fibers are disposed within the engineering plastic.

11. The battery of claim 10, wherein the engineering plastic includes at least one material selected from the group consisting of poly amide (PA), poly acetal, and poly carbonate (PC).

12. The battery module of claim 1, wherein the module case comprises a reinforcing fiber layer and the reinforcing fibers are disposed within the reinforcing fiber layer.

13. The battery module of claim 12, wherein the reinforcing fiber layer is formed on an outer surface of the module case.

14. The battery module of claim 12, wherein the reinforcing fiber layer is formed on an inner surface of the module case.

15. The battery module of claim 1, wherein the reinforcing fibers are formed of glass fiber.

16. The battery module of claim 1, wherein the reinforcing fibers are made of carbon fiber.

17. The battery module of claim 1, wherein the reinforcing fibers are configured to support a pressure when the plurality of rechargeable batteries are expanded while being charged and/or discharged.

\* \* \* \* \*